United States Patent [19]

Egami

[11] Patent Number: 5,369,743
[45] Date of Patent: Nov. 29, 1994

[54] PICTURE DISPLAYING METHOD FOR SWITCHING AMONG PICTURE DISPLAY TASKS

[75] Inventor: Noritaka Egami, Nagasaki, Japan

[73] Assignee: Mitsubishi Denki Kabushiki Kaisha, Tokyo, Japan

[21] Appl. No.: 166,892

[22] Filed: Dec. 15, 1993

Related U.S. Application Data

[63] Continuation of Ser. No. 684,269, Apr. 12, 1991, abandoned.

[30] Foreign Application Priority Data

Apr. 16, 1990 [JP] Japan .................................. 2-99821

[51] Int. Cl.⁵ .............................................. G06F 15/62
[52] U.S. Cl. .................................................... 395/157
[58] Field of Search ........................... 345/119–120, 345/118, 113; 395/155–161, 145

[56] References Cited

U.S. PATENT DOCUMENTS

| | | | |
|---|---|---|---|
| 4,555,775 | 11/1985 | Pike | 395/158 |
| 4,618,858 | 10/1986 | Belch | 395/157 X |
| 4,642,790 | 2/1987 | Minshull et al. | 395/157 X |
| 4,653,020 | 3/1987 | Cheselka | 395/157 |
| 4,688,167 | 8/1987 | Agarwal | 395/157 X |
| 4,713,754 | 12/1987 | Agarwal et al. | 395/145 X |
| 4,769,636 | 9/1988 | Iwami et al. | 395/158 X |
| 4,783,648 | 11/1988 | Homna et al. | 340/724 |
| 4,819,189 | 4/1989 | Kikuchi et al. | 395/157 |
| 4,845,644 | 7/1989 | Anthias et al. | 395/157 |
| 4,862,389 | 8/1989 | Takagi | 395/158 X |
| 4,914,607 | 4/1990 | Takanashi et al. | 395/158 |
| 4,931,957 | 6/1990 | Takagi et al. | 395/157 X |
| 5,091,720 | 2/1992 | Wood | 395/157 X |
| 5,091,866 | 2/1992 | Takagi | 395/158 |
| 5,253,340 | 10/1993 | Inoue | 395/158 X |

FOREIGN PATENT DOCUMENTS

| | | | |
|---|---|---|---|
| 0176950 | 4/1986 | European Pat. Off. | |
| 61-20088 | 1/1986 | Japan | G06G 1/00 |
| 61-20088 | 1/1986 | Japan | G06G 1/00 |
| 62-182979 | 8/1987 | Japan | G06F 15/72 |
| 63-100534 | 5/1988 | Japan | G06F 3/14 |

OTHER PUBLICATIONS

Rosenberg, "Dictionary of Computers, Information Processing & Telecommunications", 1987, pp. 120, 402.

Primary Examiner—Mark R. Powell
Assistant Examiner—John E. Breene
Attorney, Agent, or Firm—Burns, Doane, Swecker & Mathis

[57] ABSTRACT

In switching a picture corresponding to a picture display task, the picture display task before switching permitted to run concurrently with a picture display task after switching, while a drawing command from the picture dissplay task before switching is promptly invalidated. window of the picture display task before switching is eliminated when the picture is switched, and therefore the drawing command from the picture display task of which the window is eliminated is made invalid.

2 Claims, 8 Drawing Sheets

DISPLAY OF PICTURE α

Fig. 1

Prior Art

Fig. 2

Prior Art

Fig. 3

Prior Art

Fig. 4

Prior Art

| | | |
|---|---|---|
| WINDOW No. 2 | DRAWING COMMAND | C1 |
| WINDOW No. 2 | DRAWING COMMAND | C2 |
| WINDOW No. 2 | ELIMINATING | C3 |
| WINDOW No. 1 | FORMING | C4 |
| WINDOW No. 1 | DRAWING COMMAND | C5 |
| WINDOW No. 2 | DRAWING COMMAND | C6 |
| WINDOW No. 1 | DRAWING COMMAND | C7 |

Fig. 8(a)

DISPLAY OF PICTURE β

Fig. 8(b)

ELIMINATION OF WINDOW No. 2

Fig. 8(c)

FORMATION OF WINDOW No. 1

Fig. 8(d)

DISPLAY OF PICTURE α

PICTURE DISPLAYING METHOD FOR SWITCHING AMONG PICTURE DISPLAY TASKS

This application is a continuation of application Ser. No. 07/684,269, filed Apr. 12, 1991, now abandoned.

BACKGROUND OF THE INVENTION

1. Field of the Invention

This invention relates to a picture displaying method whereby a picture corresponding to a picture display task switched among a plurality of the picture display tasks is displayed on a displaying device such as a CRT displaying one or the like.

2. Description of Related Art

Figure 1:
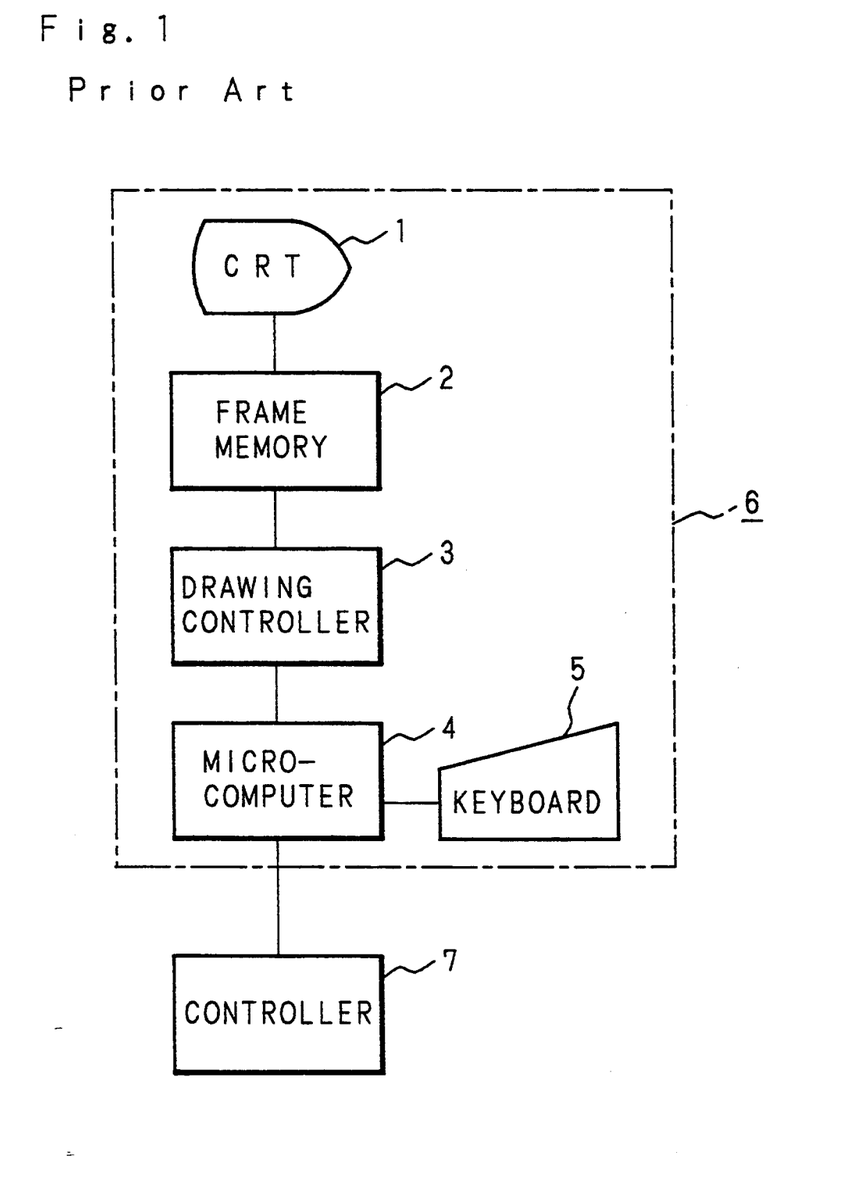
FIG. 1 is a block diagram showing the structure of a general man-machine interface apparatus.

Generally, a man-machine interface apparatus 6 as indicated in a block diagram of FIG. 1 consists of a CRT displaying device 1, a frame memory 2 for recording pixel information per a dot unit, a drawing controller 3 for drawing a picture into the frame memory 2, a microcomputer 4 incorporated with a multi-task operation system and, a keyboard 5 for inputting data into the microcomputer 4 therethrough. The microcomputer 4 is connected with a controller 7 which holds the drawing data and controls the microcomputer 4.

Figure 2:
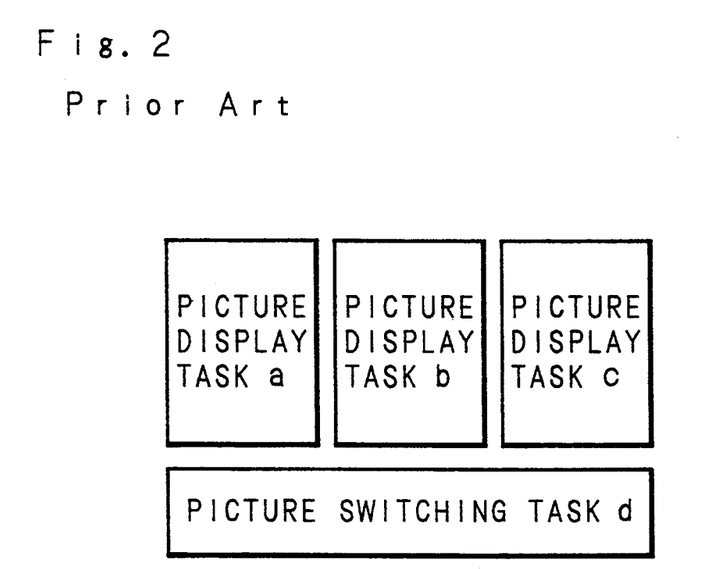
FIG. 2 is a block diagram showing the constitution of tasks within a microcomputer of FIG. 1.

FIG. 2 illustrates the constitution of tasks inside the microcomputer 4. There are three kinds of Dicture display tasks a,b and c as well as a picture switching control task d for controlling the activation and switching of the picture display tasks a–c. By way of example, if a key A (not shown) of the keyboard 5 is depressed, the picture switching control task d detects the depression thereby to activate the picture display task a. In consequence, the drawing controller 3 is turned intelligent, drawing a picture in the frame memory 2 on the basis of a drawing command from the microcomputer 4 (picture display task a), etc. The result is displayed on the CRT displaying device 1.

Figure 3:
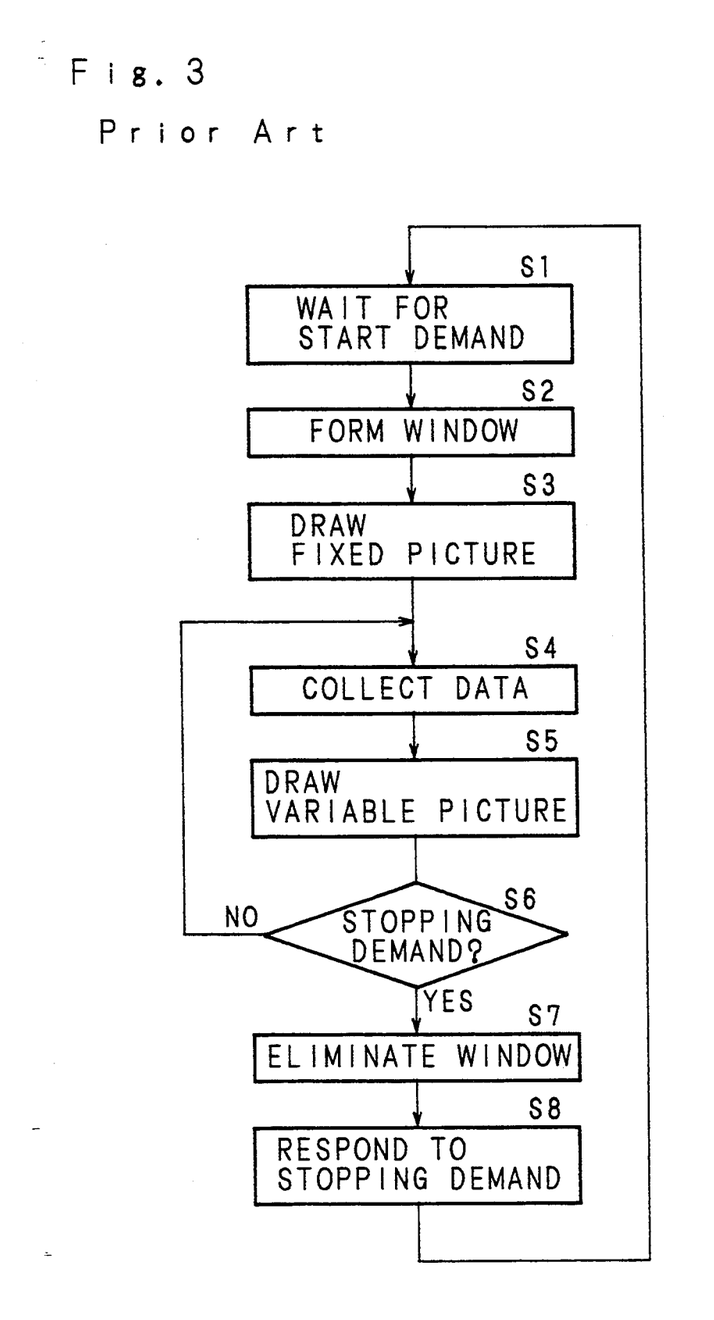
FIG. 3 is a flow chart showing the conventional picture display process.

The operation of each picture display task a,b or c is shown in a flow chart in FIG. 3, and the procedure for the picture display (in the present instance, the picture dis1, play task a) will now be described with reference to this FIG. 3.

In the first place, a start demand from the picture switching control task d is waited for (step S1). When the start demand is extracted from the task d, a window is formed (step S2). In forming the window, the drawing area in the frame memory 2 is determined. Although it is possible to divide the screen into a plurality of sections thereby to draw a plurality of pictures simultaneously at one time, the whole of the Frame memory 2 is rendered one window in the present instance for brevity. Moreover, the picture display tasks a,b and c are allotted with the window Nos. 1,2 and 3, respectively. Therefore, a window forming command extracted from the picttare display task a reads as "Window forming (command), window No. 1—the drawing area is the whole area of the frame memory". Every drawing command extracted from the picture display task a is always added with the window No. 1 henceforward.

Secondly, a fixed picture is drawn (step S3). A group of drawing commands are extracted to display a fixed picture after a picture clear command is generated. The window No. 1 is-added to the group of the commands. Since the window No. 1 has been already formed, the drawing controller 3 executes drawing into the frame memory 2 on the basis of the drawing commands. Then, the data held by the controller 7 are collected in communication with the microcomputer 4 (step S4). A group of drawing commands to display a variable picture are extracted on the basis of the collected data, with the window No. 1 added. The window No. has been aready formed and therefore, the drawing controller 3 executes drawing into the frame memory 2 as indicated by the drawing commands (step S5).

It is checked whether a task stopping demand is extracted from the picture switching control task d (step S6). Without the task stopping demand, it is returned to the data collecting step, thereby repeatedly collecting the data (step S4) and drawing a variable picture (step S5). On the contrary, with the task stopping demand extracted, the command directed to the window No. 1 is turned ineffective. Therefore, if the drawing command with the window No. extracted henceforth, the drawing controller 3 is regarded as in the error state without having formed the window. However, the drawing command to the window No. 1 is logically not extracted, and eventually the window is eliminated (step S7). Subsequently, a response to the task stopping demand is returned to the picture switching control task d (step S8). The flow is returned to the step S1 to wait for a start demand.

Figure 4:
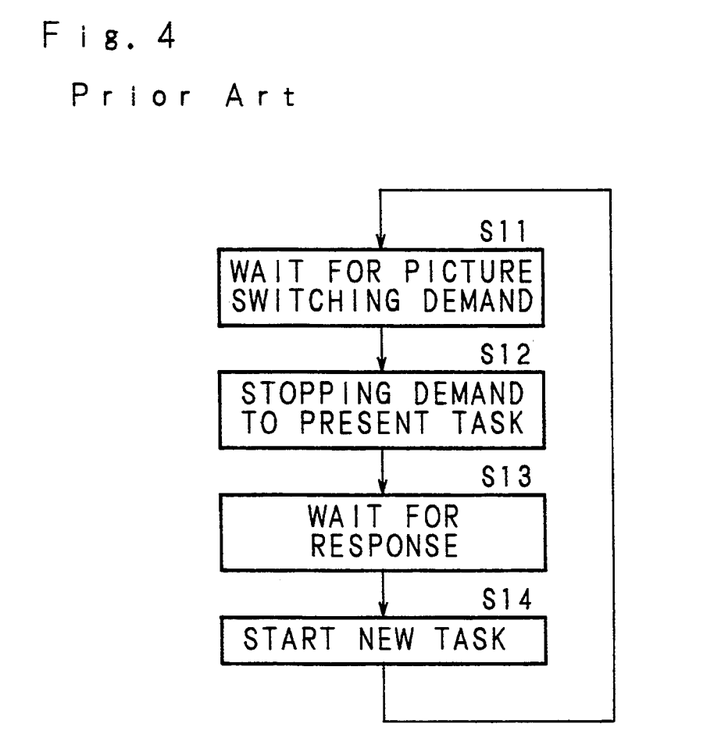
FIG. 4 is a flow chart showing the conventional picture switching process.

FIG. 4 is a flow chart indicating the operation of the picture switching control task d, based on which the proedure to switch the picture will be explained below. It is to be noted here that the following explanation is related to the case where a picture $\beta$ by the picture display task b which is currently being displayed is switched to a picture $\alpha$ through depression of the key A of the keyboard 5.

In general, it is in the waiting state for a picture switching demand (to wait for the key to be depressed) (step S11). When the key A is depressed, the waiting state is released, and a stopping demand is generated to the present picture display task b (step S12). A response from the task b is waited (step S13). When the response is generated, a start command is generated to the picture display task a (step S14), thereby returning to the waiting state again.

In this case, when the present task b is stopped, the picture switching control task d and picture display task b exchange messages therebetween. This is because the picture display tasks a and b might work at the same time unless the task a is started after the task b is completely stopped. In other words, the drawing command from the picture display task b would be carried out while a fixed picture corresponding to the picture display task a is drawn, resulting in the partial mix-up of the variable picture $\beta$ into the picture $\alpha$. The messages are accordingly necessary to be exchanged between the tasks d and b in order to prevent the above-discussed mix-up.

Conventionally, the picture is switched in the manner as described hereinabove in the man-machine interface device. In the above-described manner, however, since the messages are exchanged between the picture switching control task d and picture display task a,b or c to stop the present task, it takes time to switch the picture. For example, when the stopping demand is generated at the very beginning of the collecting step of the data, it is impossible to respond to the stopping demand immediately until the variable picture is drawn. Collecting data and drawing the variable picture take several seconds, thereby decreasing the responding efficiency to switch a picture. Although may be considered to subdivide the data collecting process and the drawing process of the variable picture to frequently confirm the presence or absence of the stopping demand, the confirming process itself is a cause of the decrease of the responding efficiency to switch a picture.

SUMMARY OF THE INVENTION

This invention has been devised to solve the aforementioned disadvantage, and has for its main object to provide a picture displaying method capable of improving the responding efficiency to switch a screen.

According to tile picture displaying method of this invention, when a picture corresponding to a picture display task is to be switched, the picture display task before switching is permitted to run concurrently with a picture display task after switching, with a drawing command from the picture display task before switching being turned invalid.

The above and further objects and features of the invention will more fully be apparent from the following detailed description with accompanying drawings.

BRIEF DESCRIPTION OF THE DRAWINGS

FIGS. 8(a), 8(b), 8(c) and 8(d) are views respectively showing an example of a display on a CRT displaying device.

DESCRIPTION OF THE PREFERRED EMBODIMENTS

A preferred embodiment of this invention will be discussed more in detail with reference to the accompanying drawings.

To switch a picture according to a picture displaying method of this invention is practicable by a man-machine interface apparatus in the structure as shown in FIG. 1, and accordingly, the man-machine interface apparatus of FIG. 1 will be used in the following description. Further, the constitution of tasks in the microcomputer 4 is the same as in FIG. 2.

Figure 5:
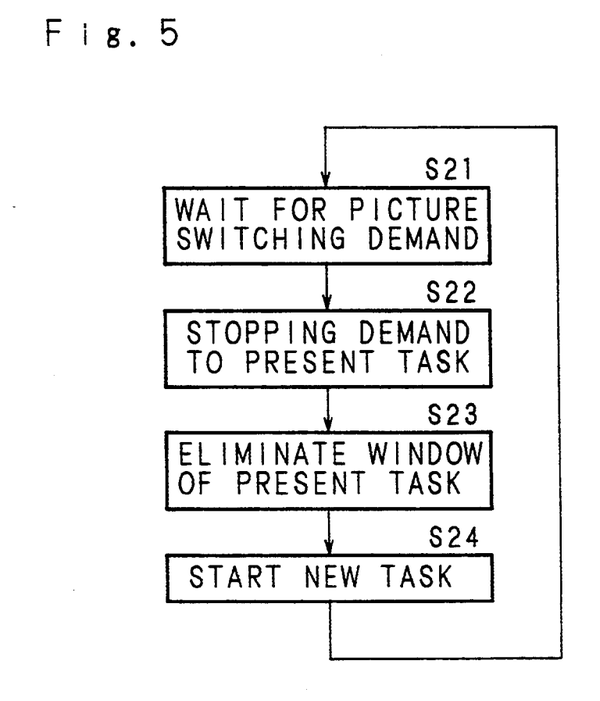
FIG. 5 is a flow chart showing the picture switching process according to this invention.

With reference to FIG. 5 showing a flow chart of the operation of the picture switching control task d of this invention, the procedure to switch a picture will be depicted. In the instant embodiment, a picture β which is being displayed by the picture display task b is switched to a picture α through depression of the key A of the keyboard 5.

it is in the waiting state for a key on the keyboard 5 to be depressed (step S21). A stopping demand is generated to the present picture display task b through depression of the key A on the keyboard 5 (step S22). Then, the window No. 2 which is the window of the present task b is eliminated (step S23). The drawing controller 3 is never actuated to any drawing command with the window No. 2 henceforth. This state of the drawing controller 3 is different from the conventional error state. A start command is generated to a new picture display task a (step S24). The Flow is returned to the waiting state for a picture switching demand.

Figure 6:
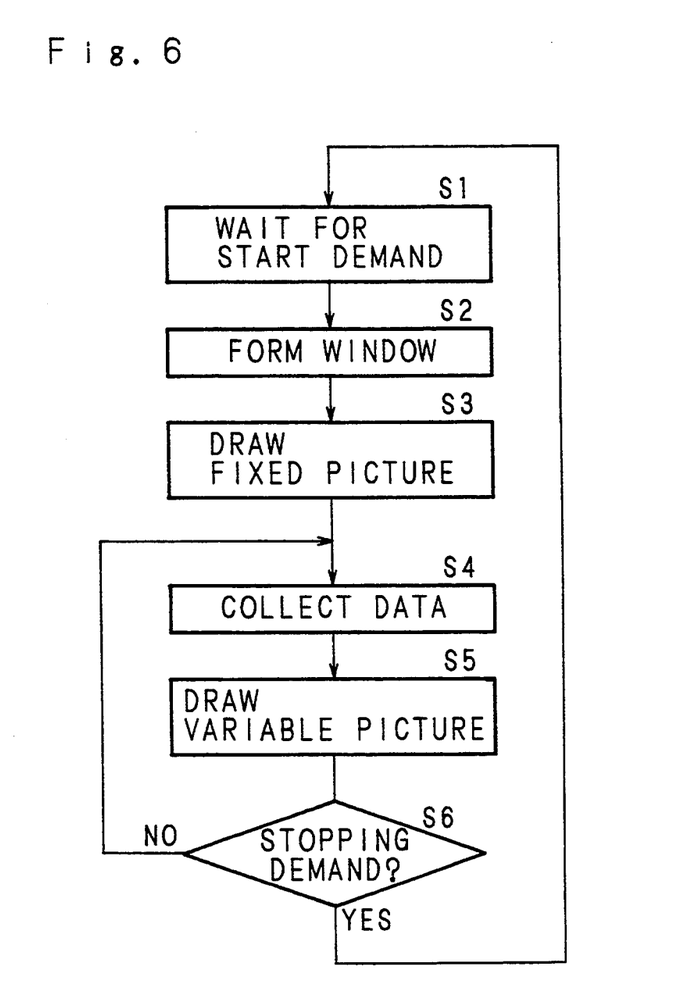
FIG. 6 is a flow chart showing the picture display process according to this invention.

FIG. 6 is a flow chart showing the operation of each picture display task a,b or c. The operation of, for example, the picture display task a will be explained with reference to FIG. 6. It is to be noted that steps S1–S6 FIG. 6 are the same proceedings as in the steps S1–S6 of FIG. 3.

A start demand from the picture switching control task d is waited for (step S1). Upon receipt of the start demand, a window is formed, e. g., the whole of the frame memory 2 is rendered to be one window (step S2). A group of drawing commands for a fixed picture added with the window No. 1 is extracted, thereby drawing a fixed picture (step S3). The data held by the controller 7 are collected through communication (step S4), and a group of drawing commands for a variable picture added with the window No. 1 is extracted to draw a variable picture (step S5). Thereafter, it is detected whether a task stopping demand is generated from the picture switching control task d (step S6). If the task stopping demand is not generated, steps S4 and S5 are repeated. On the contrary, if the task stopping demand is present, the flow is returned to the waiting state for a start demand.

In comparison with the conventional operation (FIG. 3), the procedures to eliminate the window (step S7) and to respond to the stopping demand (step S8) are abbreviated in the operation of the picture display task according to this invention, and the messages are not exchanged between the tasks d and a,b or c. Therefore, a new picture can be displayed immediately after the stopping demand is generated (after the picture is switched).

Figure 7:
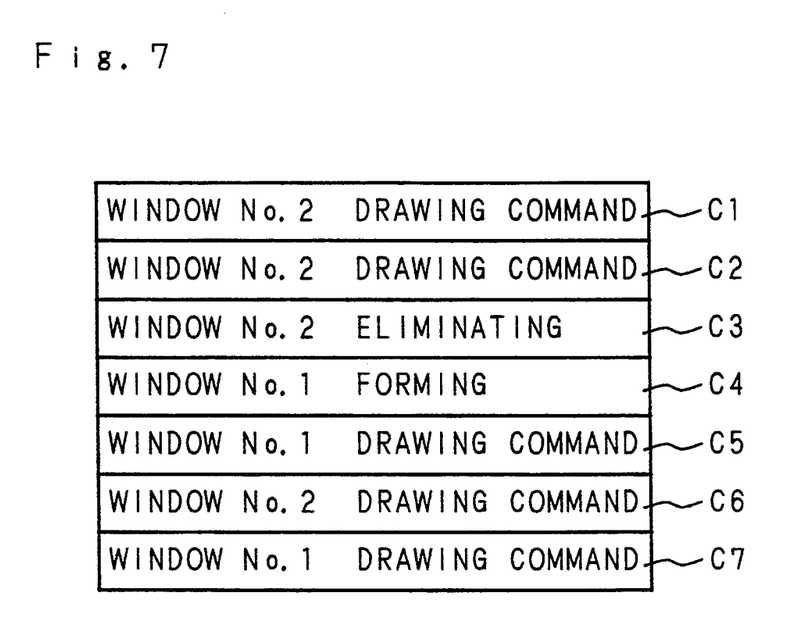
FIG. 7 is a diagram of a format showing the constitution of drawing commands of this invention.
Figure 8A:
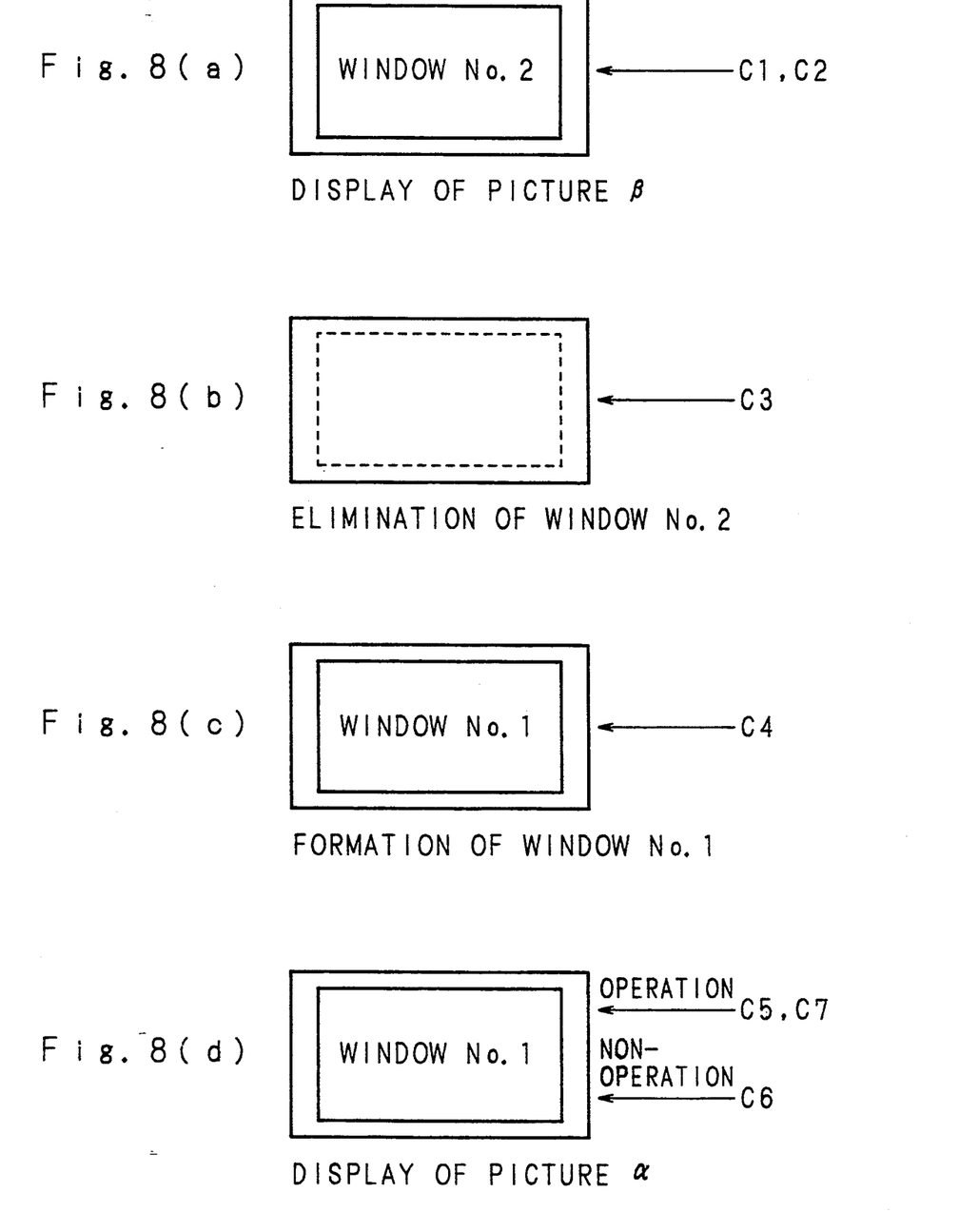

Although it is a short time, the picture display tasks a and b run concurrently after the task a is started before the task b is stopped. Despite this fact, however, the picture is normally displayed according to this invention. The reason for this will be discussed hereinbelow with reference to FIG. 7 which shows the constitution of drawing commands to the drawing controller 3 and FIG. 8 which shows the change with time of the display on the CRT displaying device 1.

The drawing command with the window No. 2 such as C1 C2 is executed before it is required to switch to the picture α. Therefore, the picture β is displayed on the CRT displaying device 1 (FIG. 8(a)). Now, supposing that it required to switch to the picture α, an eliminating command C3 to eliminate the window 2 is extracted from the picture switching control task d, so that the window No. 2 is eliminated from the CRT displaying device 1 (FIG. 8(b)). Subsequently, a forming command C4 to form the window No. 1 is extracted from the picture switching control task d and the window No. 1 is displayed on the CRT displaying device (FIG. 8(c)). Thereafter, drawing commands C5 and C7 with the window No. 1 for the picture α are sequentially extracted. Although a drawing command C6 with the window No. 2 for the picture β may be mixed up wiLh the commands C5 and C7 since the picture display task b is active for while, the drawing controller 3 is not actuated to any drawing command with the window No. 2 because of the fact that the window No. 2 is already eliminated. As a result, the picture α is normally displayed (FIG. 8(d)).

The window No. is fixedly allotted in the picture in the foregoing embodiment. However, it may be possible that the picture switching control task d controls or manages the total window Nos. and hands the required window No. when a picture display task is activated. That is, a variable allotment may be possible.

Moreover, although the CRT displaying device 1 is used as a displaying device in the foregoing embodiment, a displaying device using a plasma, liquid crystal or the like may be employable.

In addition, although the drawing controller 3 is separated from the microcomputer 4 in the foregoing embodiment, the microcomputer 4 may be adapted to control drawing as well.

In the foregoing embodiment, there are in the controller unprocessed data 7 to be collected. However, the data held by the microcomputer 4 can be utilized as the drawing data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A picture display method for displaying a plurality of windows on a display device, comprising the steps of:
    forming a first window on the display device;
    drawing a first picture in the first window using a plurality of first drawing command;
    eliminating the first window and the first picture from the display device prior to completion of the first drawing commands used to draw the first picture;
    forming a second window on the display device prior to the completion of the first drawing commands used to draw the first picture;
    drawing a second picture in the second window using a plurality of second drawing commands prior to the completion of the first drawing commands used to draw the first picture; and
    rendering non-operational any first drawing commands that occur after the forming of the second window or the drawing of the second picture;
    wherein the second drawing commands begin prior to the completion of the first drawing commands.

2. A method according to claim 1 wherein the display device is a cathode ray tube.

* * * * *